United States Patent
Edwards et al.

[11] Patent Number: 5,642,003
[45] Date of Patent: Jun. 24, 1997

[54] POWER SYSTEM SWITCH INCORPORATING A POSITIVE-SEQUENCE FUNDAMENTAL SIGNAL MAGNITUDE DETECTOR

[75] Inventors: Charles W. Edwards, Monroeville, Pa.; Nicholas C. Abi-Samra, Irvine, Calif.

[73] Assignee: Electric Power Research Institute, Inc., Palo Alto, Calif.

[21] Appl. No.: 517,897

[22] Filed: Aug. 22, 1995

[51] Int. Cl.$^6$ ........................ H02M 1/12
[52] U.S. Cl. ............... 307/64; 307/64; 307/105; 361/76; 361/80; 361/81; 363/1; 363/39; 327/555
[58] Field of Search ............... 307/64, 43, 105; 361/80, 76, 81, 91; 364/481; 363/39, 40, 1; 327/555

[56] References Cited

U.S. PATENT DOCUMENTS

| | | | |
|---|---|---|---|
| Re. 30,134 | 10/1979 | McClain et al. | 361/76 |
| 4,210,948 | 7/1980 | Waltz | 361/76 |
| 4,811,236 | 3/1989 | Brennen et al. | 364/483 |
| 5,166,887 | 11/1992 | Farrington et al. | 364/483 |
| 5,367,426 | 11/1994 | Schweitzer, III | 361/80 |
| 5,384,696 | 1/1995 | Moran et al. | 363/40 |
| 5,513,090 | 4/1996 | Bhattacharya et al. | 363/40 |

*Primary Examiner*—David S. Martin
*Assistant Examiner*—Albert W. Paladini
*Attorney, Agent, or Firm*—Flehr Hohbach Test Albritton & Herbert LLP; William S. Galliani

[57] ABSTRACT

A power switching apparatus includes a positive-sequence fundamental signal magnitude detector. The positive-sequence fundamental signal magnitude detector derives a positive-sequence fundamental signal from a three-phase voltage signal carried by a power line; it also generates a switch firing command when the positive-sequence fundamental signal exceeds a predetermined threshold value indicative of a fault condition on the power line. The power switching apparatus also includes a solid state switch connected to the power line and the positive-sequence fundamental signal magnitude detector. The solid state switch bloch power on the power line in response to the switch firing command.

21 Claims, 3 Drawing Sheets

POWER SYSTEM SWITCH INCORPORATING A POSITIVE-SEQUENCE FUNDAMENTAL SIGNAL MAGNITUDE DETECTOR

BRIEF DESCRIPTION OF THE INVENTION

This invention relates generally to power system switching devices. More particularly, this invention relates to a power system switch that executes switching operations in response to a detector which identifies the magnitude of a positive-sequence fundamental voltage signal on the power system.

BACKGROUND OF THE INVENTION

Electric power distribution systems are commonly exposed to line disturbances, also called transient conditions, current (voltage) transients, and short-circuit conditions. Line disturbances may arise from insulation breakdowns, lightning strikes, or other faults. In the presence of a line disturbance, solid-state transfer switches are used to quickly switch between a failed primary feeder and an alternative secondary feeder, such that utility customers receive uninterrupted power. Solid-state transfer switches may be implemented with Gate Turn-Off Thyristors (GTOs). GTOs have sub-cycle response times. Thus, once a line disturbance is identified, an instantaneous response is possible. The problem is to accurately discriminate between true line disturbances and short term transients.

A conventional magnitude detector is commonly used to detect the loss of a three-phase utility line. A conventional magnitude detector rectifies and filters the three line-to-neutral or line-to-line voltages of the utility line and then compares the value to a threshold. The problem with a rectifier-filter magnitude detector of this type is peak sensitivity. Harmonics and transients significantly affect the peak value. To reject these effects, heavy filtering must be employed. The requisite filtering delays the detection of a line disturbance. Thus, it would be highly desirable to provide a power system switch with the capability of rapidly and accurately assessing system voltage magnitude values indicative of fault conditions.

SUMMARY OF THE INVENTION

The invention is a power switching apparatus with a positive-sequence fundamental signal magnitude detector. The positive-sequence fundamental signal magnitude detector derives a positive-sequence fundamental signal from a three-phase voltage signal carried by a power line; it also generates a switch firing command when the positive-sequence fundamental signal exceeds a predetermined threshold value indicative of a fault condition on the power line. The power switching apparatus also includes a solid state switch connected to the power line and the positive-sequence fundamental signal magnitude detector. The solid state switch blocks power on the power line in response to the switch firing command.

The method of the invention includes the step of sampling a three-phase voltage on a primary feeder line. Then, a positive-sequence fundamental signal is derived from the three-phase power signal. A switch firing command is generated when the positive-sequence fundamental signal exceeds a predetermined threshold value indicative of a fault condition on the primary feeder line. The switch firing command operates to block power on the primary feeder line and to pass power on a secondary feeder line such that the load receives an uninterrupted supply of power.

The present invention is advantageous in that it can quickly and accurately identify a power line fault that requires corrective action. These benefits are attributable to the invention's monitoring of the positive-sequence fundamental signal magnitude at the power distribution level. This signal can be readily derived through synchronous transformations. In such an embodiment, the positive-sequence fundamental signal is a dc quantity whose magnitude is easily assessed in relation to a predetermined threshold.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the drawings.

DETAILED DESCRIPTION OF THE INVENTION

The present invention is a novel power switch that uses a detector to identify the magnitude of a positive-sequence fundamental voltage signal. This magnitude value is then used to determine whether a switching event should be initiated. More particularly, this magnitude value is used to determine whether a substantial line disturbance exists, and if so, to generate a switch firing command which causes a switch on a primary feeder to block power flow and a switch on a secondary feeder to enable power flow. In this way, the load will receive an uninterrupted supply of power even in the presence of a substantial line disturbance.

This brief overview of the invention allows those skilled in the art to recognize a number of advantages of the disclosed technology. Many devices, such as motors, which are a significant portion of utility loads, respond primarily to the positive-sequence fundamental component of the three-phase voltage. Other devices, such as computers, solid-state motor drives, and other electronic devices are more sensitive to peak values. The devices between the distribution station and the user, such as transformers and voltage compensation capacitors, reduce the current distortion at the distribution level. These devices also prevent the propagation of distribution level transients to the user end. These effects tend to make the peak voltages at the user location proportional to the positive-sequence fundamental at the distribution level. Consequently, measuring the positive-sequence fundamental voltage at the distribution level is a good method for discriminating between substantial disturbances requiring corrective action and minor transients which can be ignored.

Figure 1:
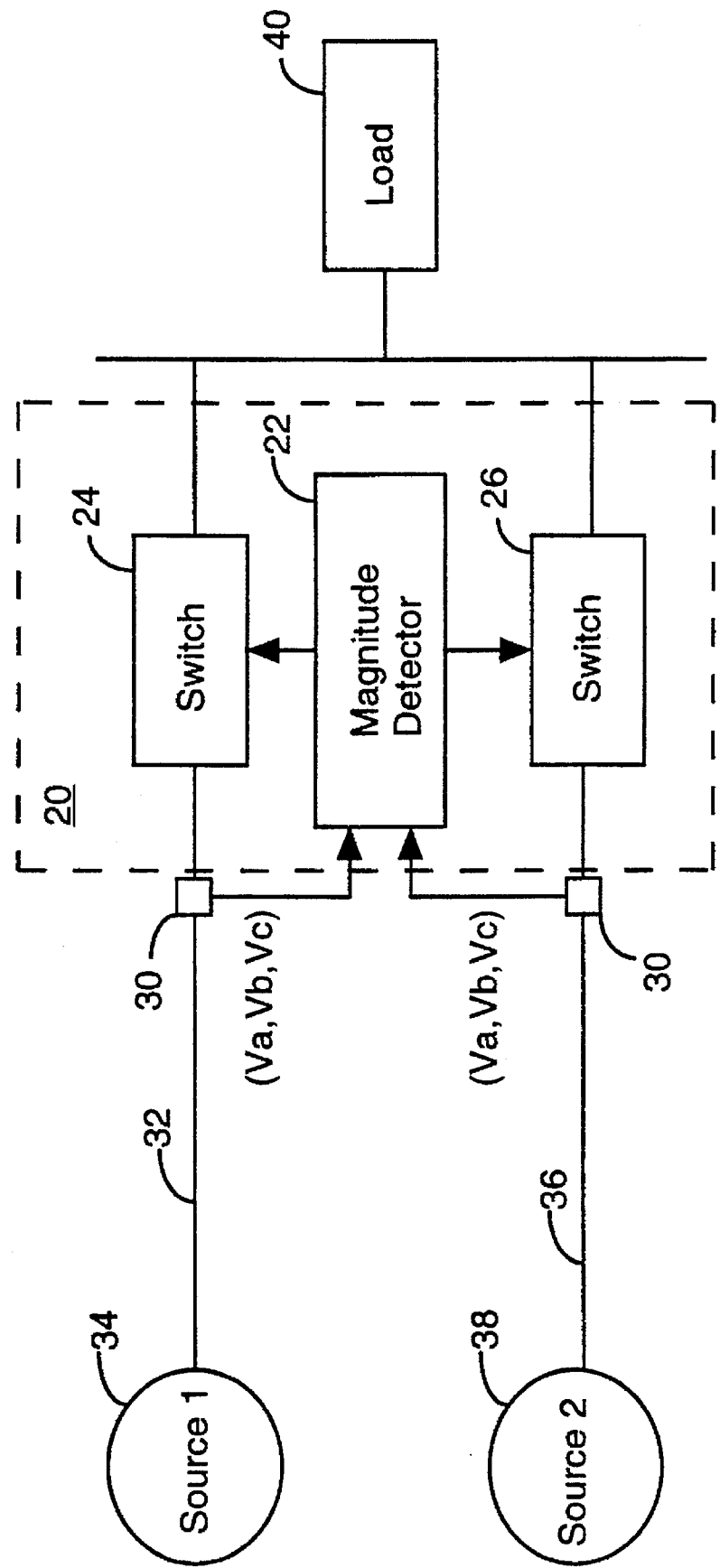
FIG. 1 illustrates the environmental topology of the power switch of the invention.

The invention is more fully appreciated with reference to FIG. 1. FIG. 1 illustrates a power system switch 20 incorporating a positive-sequence fundamental signal magnitude detector. The switch 20 includes a magnitude detector 22 connected to one or more switches 24, 26. The switches 24, 26 may be implemented with Gate Turn-Off thirsters or equivalent devices. The switches 24, 26 are activated and de-activated in a known manner. The present invention is directed toward the combination of the switches 24, 26 with the novel magnitude detector 22. The magnitude detector 22 is connected to at least one voltage transducer 30. The voltage transducer 30 provides the magnitude detector with three-phase voltage signals (Va, Vb, Vc).

The switch 20 is connected to a primary feeder line 32 which is driven by a first voltage source 34. The switch 20 may also be connected to a secondary feeder line 36 which is driven by a second voltage source 38. In such a configuration, the magnitude detector 22 of switch 20 is used to monitor the three-phase voltage signals on the primary feeder line 32. The three-phase voltage signals are transformed by the magnitude detector 22 into a positive-sequence fundamental signal that is compared to a predetermined threshold value indicative of a fault condition. If the magnitude detector 22 identifies that the positive-sequence fundamental signal has exceeded the predetermined threshold value, then it generates a switch firing command that is applied to switch 24, causing switch 24 to block power from the first source 34 from reaching the load 40. The switch firing command may also be applied to switch 26 such that it is closed, and thereby enables power from the second source 38 to reach the load 40. Techniques to activate and de-activate switches 24, 26 are known in the art. The sequence of activating switches 24 and 26 is not crucial. The invention is directed toward the activation of any switch in response to an assessment of the positive-sequence fundamental signal magnitude, as performed by the magnitude detector 22. Attention is presently directed toward this element, as shown in FIG. 2.

Figure 2:
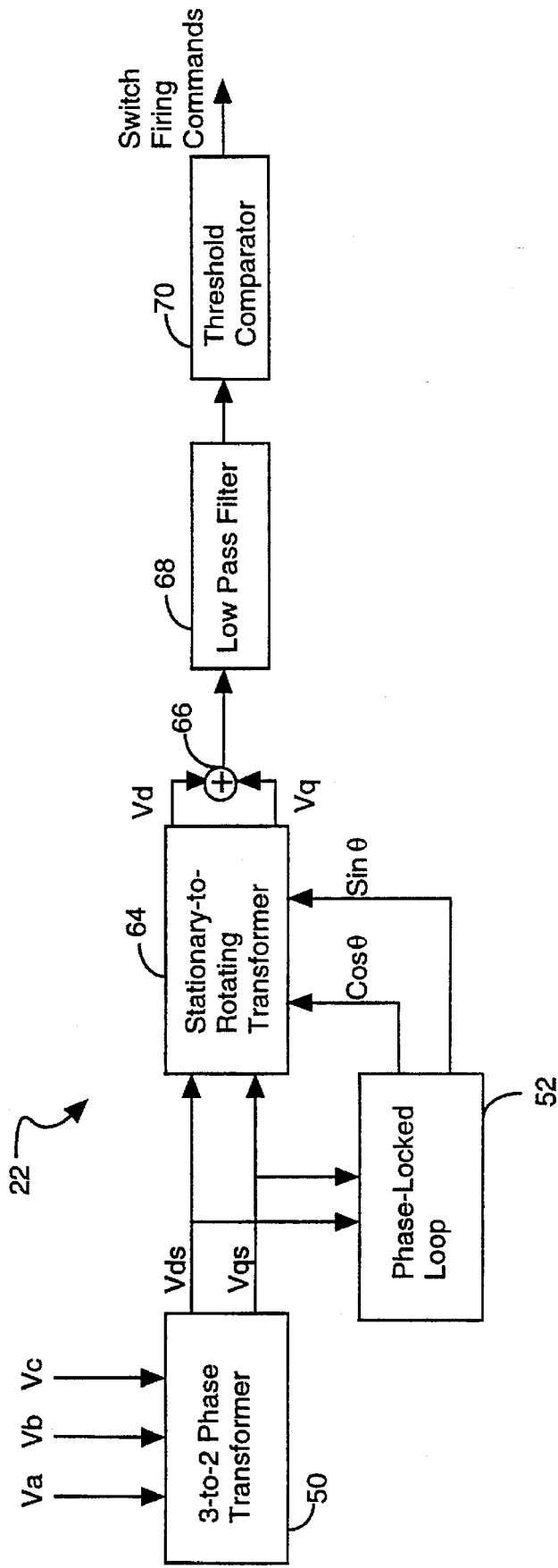
FIG. 2 illustrates one embodiment of a positive-sequence fundamental signal magnitude detector that may be used in accordance with the power switch of the invention.

FIG. 2 illustrates one embodiment of a magnitude detector 22 that may be used in accordance with the invention. The magnitude detector 22 preferably performs a synchronous transformation on the three-phase voltage signals Va, Vb, Vc sampled from the primary feeder line 32 or secondary feeder line 36. Synchronous transformations have been used in active power line conditioning. U.S. Pat. No. 5,287,288 (the '288 patent), assigned to the assignee of the present invention and expressly incorporated by reference herein, discloses the use of synchronous transformations in active power line conditioning. Synchronous control through synchronous transformations is based on motor control theory. More particularly, synchronous control relies upon the fact that the rotor of a motor has two axes of magnetic symmetry. One axis is known as the direct axis, and the other axis is known as the quadrature axis. These terms are usually shortened to simply refer to the d-axis and the q-axis. A three phase system can be mathematically transformed into the direct axis and quadrature axis scheme. That is, a three phase system, such as a three phase power line (Va, Vb, Vc), can be synchronously transformed into a two phase d-axis/q-axis scheme, which is stationary with respect to the three phase system. This 3-phase to 2-phase transformation may be accomplished using the following equation:

$$\begin{bmatrix} Vds \\ Vqs \\ 0 \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \\ \frac{1}{\sqrt{2}} & \frac{1}{\sqrt{2}} & \frac{1}{\sqrt{2}} \end{bmatrix} \begin{bmatrix} Va \\ Vb \\ Vc \end{bmatrix}$$ (Equation 1)

The same transformation may be accomplished by using the following alternate equation:

$$\begin{bmatrix} Vds \\ Vqs \\ 0 \end{bmatrix} = \frac{1}{3} \begin{bmatrix} 1 & 0 & 1 \\ -\sqrt{3} & 0 & -\sqrt{3} \\ 0 & 0 & 0 \end{bmatrix} \begin{bmatrix} Vab \\ 0 \\ Vca \end{bmatrix}$$ (Equation 2)

Thus, returning to FIG. 2, illustrated therein is a 3-to-2 phase transformer 50. The 3-to-2 phase transformer 50 executes the operation of Equation 1 or Equation 2, depending on the type of voltage sensing used. The 3-to-2 phase transformer 50, as the other elements of the magnitude detector 22, may be implemented in software, as a hardwired circuit, as an embedded system, or other analogous embodiment known to those skilled in the art. For example, if implemented in software, the voltage signals Va, Vb, Vc would be digitized and applied to a central processing unit operating in connection with a memory storing a set of executable instructions. The executable instructions would include instructions to execute the operation of Equation 1. Similar instructions would exist to perform the operations of the phase-locked loop 52, the stationary-to-rotating transformer 64, the adder 66, the low pass filter 68, and the threshold comparator 70.

The output of the 3-to-2 phase transformer 50 is a set of stationary d-q variable signals Vds, Vqs that are applied to a phase-locked loop 52 and a stationary-to-rotating transformer 64. The phase-locked loop 52 generates output signals (a cos θ signal and a sin θ signal) that are applied to the stationary-to-rotating transformer 64, thus operation of the phase-locked loop 52 will be described first.

Figure 3:
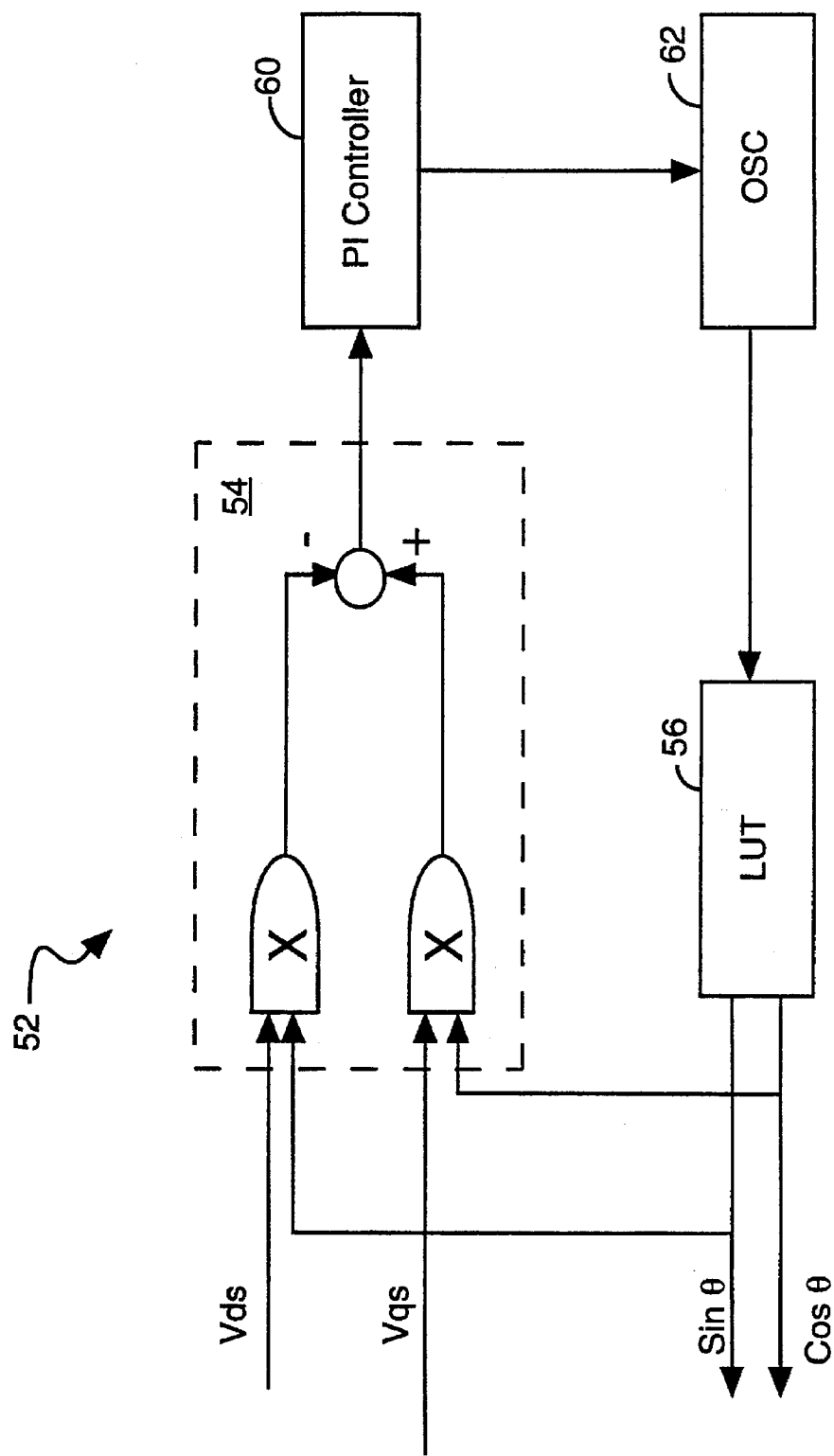
FIG. 3 illustrates a phase-locked loop that may be used in the detector of FIG. 2.

FIG. 3 illustrates a prior art phase-locked loop 52 that may be used in accordance with the invention. The phase-locked loop 52 generates a value θ, which is the angle of the input voltage vector with respect to the stationary reference frame. The value may be obtained as follows. The stationary d-q variable signals Vds, Vqs are conveyed to a phase detector 54. The phase detector 54 output may be defined as:

$$\sin(\text{phase error}) = Vqs^* \cos\theta - Vds^* \sin\theta$$

In the equation, sin θ and cos θ are the values presently pointed to in a look-up table 56. The phase detector 54 output is processed by a proportional plus integral (PI) controller 60 which provides fast response and zero steady-state tracking error. The PI controller 60 output is used to determine the count parameter of a timer or digital oscillator 62. The timer count value is decremented from the count parameter value at a constant rate, when zero is reached the sin θ and cos θ pointers in the look-up table 56 are incremented. Since this is a closed-loop system, the timer count value is either increased or decreased, depending on the PI controller 60 output, so as to reduce the phase error until a phase-locked condition is achieved. The phase-locked loop 52 of FIG. 3 is a digital device. A number of equivalent devices are known in the art. Those skilled in the art will recognize any number of equivalent hardware devices that may also be used.

The stationary-to-rotating transformer 64 synchronously transforms the stationary d-q variable signals into rotating d-q variable signals. This transformation relies upon the cos θ signal and the sin θ signal from the phaselocked loop 52. The transformation is often referred to as a "vector rotation" since the d-q quantities can be combined as a vector and the transformation then amounts to the rotation of one vector with respect to the other. The transformation may be accomplished using the following equation:

$$\begin{bmatrix} V_d \\ V_q \end{bmatrix} = \begin{bmatrix} \cos\theta & \sin\theta \\ -\sin\theta & \cos\theta \end{bmatrix} \begin{bmatrix} V_{ds} \\ V_{qs} \end{bmatrix} \quad \text{(Equation 3)}$$

In other words, the stationary-to-rotating transformer 64 executes the operation of Equation 3. It will be noted that this operation can be simplified by setting Vq to zero, since the reference angle θ determined by the phase-locked loop 52 is in phase with the line voltage. Thus, there is no quadrature (Vq) component resulting from the stationary-to-rotating frame conversion.

The output of the stationary-to-rotating transformer 64 is a set of stationary d-q variable signals Vd, Vq that are combined with an adder 66 to yield a composite d-q variable signal. The composite d-q variable signal rotates in the d-q reference frame at a synchronous frequency θ. In this reference frame, the fundamental component of the composite d-q variable signal is transformed to a dc quantity and all harmonic components are transformed to non-dc quantities. Since any non-dc components in the synchronous reference frame are attributed to harmonics in the three-phase reference frame, low-pass filtering of the synchronous reference frame signal yields the fundamental voltage signal in the three-phase reference frame. That is, a low pass filter 68 is used to obtain a dc signal corresponding to the fundamental voltage signal carried on the primary feeder line 32.

The low pass filter may be implemented in a number of ways. For example, the filter may be implemented as a one-pole low-pass filter. The low pass filter may also be implemented as a sliding-window filter (also known as a moving-average filter), described in U.S. Pat. No. 4,811,236, which is expressly incorporated by reference herein. A sliding window filter averages a predetermined number of samples, N. If the time between the oldest and newest sample is equal to the line frequency period, the filter will have zeroes at the harmonic frequencies and all harmonic components up to the Nyquist limit will be fully rejected by the filter. Since all of the samples are equally weighted, transients have less effect than is the case for a low-pass filter with a similar cutoff frequency. Each time a sliding-window filter is updated, only the newest and the oldest input values are changed, all of the intermediate values are the same. In fact, a sliding window filter may be implemented digitally by maintaining a circular buffer of N values and a sum total for the values. When a new value is obtained, the oldest value is subtracted from the total, the new value is added into the total, and the oldest value from the circular buffer is overwritten by the newest value. The buffer index is incremented modulo N and the output is determined by dividing the total by N.

As indicated above, the output of the low pass filter 68 is a dc quantity corresponding to the fundamental of the input voltage vector. A threshold comparator 70 is used to compare the magnitude of this dc quantity to a predetermined threshold value indicative of a fault condition. If the magnitude of the dc quantity exceeds the predetermined threshold value, switch firing commands can be generated in a standard manner. As previously indicated, the switch firing commands may include commands to open switch 24 such that power from primary feeder line 32 is blocked. In addition, the switch firing commands may include commands to close switch 26 such that power from secondary feeder line 36 is allowed to pass to the load 40.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A power switching apparatus, comprising:

a positive-sequence fundamental signal magnitude detector to p2 derive a positive-sequence fundamental signal from three-phase voltage signals obtained from a power line, and generate a switch firing command when said positive-sequence fundamental signal exceeds a predetermined threshold value indicative of a fault condition on said power line;

a voltage transducer connected to said power line and said positive-sequence fundamental signal magnitude detector to deliver said three-phase voltage signals to said positive-sequence fundamental signal magnitude detector; and a solid state switch for connection to said power line and said positive-sequence fundamental signal magnitude detector, said solid state switch blocking power on said power line in response to said switch firing command.

2. The power switching apparatus of claim 1 wherein said positive-sequence fundamental signal magnitude detector derives said positive-sequence fundamental signal through a synchronous transformation of said three-phase voltage signals.

3. The power switching apparatus of claim 2 wherein said positive-sequence fundamental signal magnitude detector performs said synchronous transformation with a three-to-two phase transformer which transforms said three-phase voltage signals into stationary d-q variable signals.

4. The power switching apparatus of claim 3 wherein said positive-sequence fundamental signal magnitude detector performs said synchronous transformation with a phase-locked loop that processes said stationary d-q variable signals to produce a cos θ signal and a sin θ signal.

5. The power switching apparatus of claim 4 wherein said positive-sequence fundamental signal magnitude detector performs said synchronous transformation with a stationary-to-rotating transformer that processes said d-q variable signals, said
cos θ signal, and said sin θ signal to form rotating d-q variable signals.

6. The power switching apparatus of claim 5 wherein said positive-sequence fundamental signal magnitude detector performs said synchronous transformation with an adder that adds said rotating d-q variable signals to generate a composite d-q variable signal.

7. The power switching apparatus of claim 6 wherein said positive-sequence fundamental signal magnitude detector performs said synchronous transformation by applying said composite d-q variable signal to a low pass filter to obtain said positive-sequence fundamental signal.

8. The power switching apparatus of claim 7 wherein said low pass filter is a one-pole low-pass filter.

9. The power switching apparatus of claim 7 wherein said low pass filter is a moving-average filter.

10. The power switching apparatus of claim 7 wherein said positive-sequence fundamental signal magnitude detector uses a threshold comparator to identify when said positive-sequence fundamental signal exceeds said predetermined threshold value and to generate said switch firing command.

11. The power switching apparatus of claim 1 wherein said solid-state switch is a Gate Turn-Off thyristor.

12. The power switching apparatus of claim 1 wherein said solid-state switch includes an activation switch connected to said positive-sequence fundamental signal magnitude detector and a second power line, said activation switch passing power on said second power line in response to said switch firing command such that a load connected to said power line and said second power line receives uninterrupted power from said second power line.

13. A method of delivering uninterrupted power to a load connected to a primary feeder line and a secondary feeder line, said method comprising the steps of:

sampling three-phase voltage signals on said primary feeder line;

deriving a positive-sequence fundamental signal from said three-phase voltage signals, wherein said deriving step includes the step of performing synchronous transformations on said three-phase voltage signal;

generating a switch firing command when said positive-sequence fundamental signal exceeds a predetermined threshold value indicative of a fault condition on said primary feeder line; and applying said switch firing command to a first switch on said primary feeder line so as to block power on said primary feeder line and to a second switch on said secondary feeder line to pass power on said secondary feeder line such that said load receives an uninterrupted supply of power.

14. The method of claim 13 wherein said performing step includes the step of transforming said three-phase voltage signals into stationary d-q variable signals.

15. The method of claim 14 wherein said performing step includes the step of using a phase-locked loop to process said stationary d-q variable signals to produce a cos θ signal and a sin θ signal.

16. The method of claim 15 wherein said performing step includes the step of processing said d-q variable signals, said cos θ signal, and said sin θ signal to form rotating d-q variable signals.

17. The method of claim 16 wherein said performing step includes the step of adding said d-q variable signals to generate a composite d-q variable signal.

18. The method of claim 17 wherein said performing step includes the step of low-pass faltering said composite d-q variable signal to obtain said positive-sequence fundamental signal.

19. A power switching apparatus, comprising:

a positive-sequence fundamental signal magnitude detector to derive a positive-sequence fundamental dc signal from three-phase voltage signals obtained from a power line, and generate a switch firing command when said positive-sequence fundamental dc signal exceeds a predetermined threshold value indicative of a fault condition on said power line; and a solid-state switch for connection to said power line and said positive-sequence fundamental signal magnitude detector, said solid-state switch blocking power on said power line in response to said switch firing command.

20. The apparatus of claim 19 wherein said positive-sequence fundamental signal magnitude detector derives said positive-sequence fundamental dc signal through a synchronous transformation of said three-phase voltage signals.

21. The apparatus of claim 19 wherein said solid-state switch includes an activation switch connected to said positive-sequence fundamental signal magnitude detector and a second power line, said activation switch passing power on said second power line in response to said switch firing command such that a load connected to said power line and said second power line receives uninterrupted power from said second power line.

\* \* \* \* \*